B. L. HENRY

Feb. 10, 1931. VALVE FOR INFLATABLE ARTICLES Re. 17,956

Original Filed April 25, 1928

WITNESSES

William S. Goebel

Chris Steinle

INVENTOR

Beulah Louise Henry

BY Munn & Co.

ATTORNEY

Reissued Feb. 10, 1931

Re. 17,956

UNITED STATES PATENT OFFICE

BEULAH LOUISE HENRY, OF NEW YORK, N. Y., ASSIGNOR OF ONE-HALF TO EDWIN A. GUINZBURG, OF NEW YORK, N. Y.

VALVE FOR INFLATABLE ARTICLES

Original No. 1,723,855, dated August 6, 1929, Serial No. 272,825, filed April 25, 1928. Application for reissue filed July 23, 1930. Serial No. 470,164.

This invention relates to the class of play balls and closely analogous articles having an inflatable body or bladder, and an outer covering therefor.

More particularly, the invention relates to means enabling the inflation of the body or bladder of an article of the indicated character, and for connecting the body or bladder with its covering.

Among the objects of the invention are: to provide an article of the indicated character with means for inflating the same, which will be more suitable for the purpose, which will not be cumbersome or of unnecessarily large proportions, which enables a person to inflate the body or bladder by blowing into said means, or by utilizing a suitable pump for that purpose.

Another object of the invention is the provision of an inflating and deflating metal valve for inflatable rubber bladders, which embodies improved structural features, whereby the valve is securely connected with the bladder, in such a manner as to prevent leakage.

Another object of the invention is the provision of novel means whereby to connect a play ball bladder with its cover, when the bladder is deflated, and which also enables the removal of the bladder from the covering when desired.

The nature of the invention and its distinguishing features and advantages will appear when the following specification is read in connection with the accompanying drawing, in which—

In practice the invention will essentially involve a play ball of any preferred type, but which will essentially include an inflatable body or rubber bladder 10, and an outer covering 11 for the bladder 10. The outer covering 11 has a laced placket or opening 12 through which the bladder 10 is inserted into and removed from the outer covering 11. A flap 13 is secured along one edge as at 14 on the inside of the covering 11 so as to be disposed over the opening 12.

Figure 1:
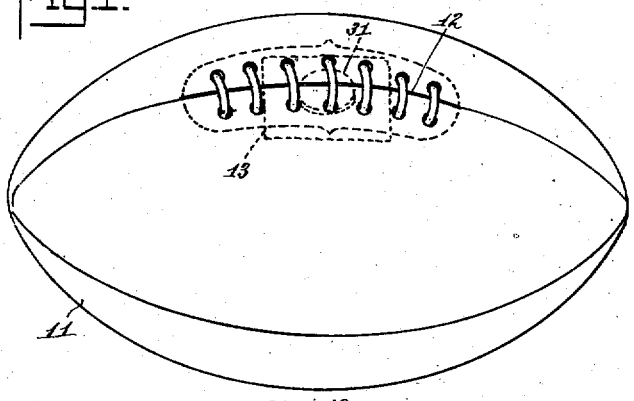
Figure 1 is a view of a football embodying the features of the present invention.
Figure 2:
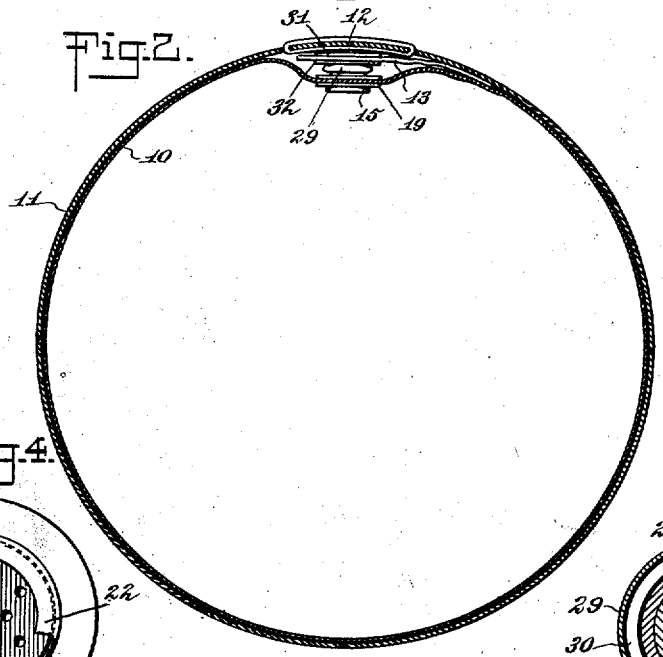
Fig. 2 is a transverse sectional view through the ball.
Figure 4:
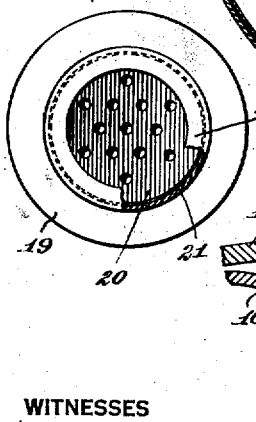
Fig. 4 is a view looking at the inside of the valve with portions broken away.
Figure 5:
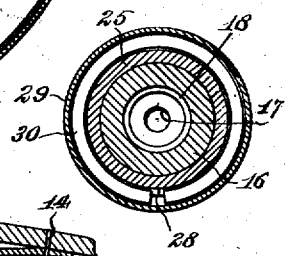
Fig. 5 is a sectional view taken on the line 5—5 of Fig. 3.
Figure 3:
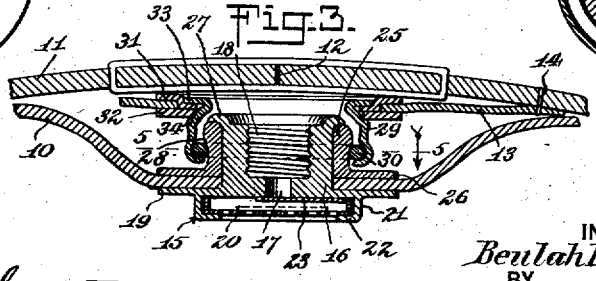
Fig. 3 is an enlarged sectional view through the valve and fastening means.
Figure 6:
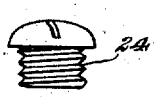
Fig. 6 is a view of a plug which may be used with the valve.

A metal valve 15 is connected with the wall of the bladder 10 for inflating and deflating the bladder. The valve includes a body 16 having a throat or air passage 17 which is threaded at the outer end as at 18. The body 16 has a flange 19. Associated with the body 16 is a perforated dished member 20 which is held in place by a circular portion 21 having a circular edge 22 turned inwardly over the marginal portion of the member 20. A valve member 23 in the form of a disk of rubber is arranged in the space presented by the member 20 and the inner face of the body 16. The member 23 is smaller in diameter than the internal diameter of the member 20, is sufficiently large to cover the inner end of the passage 17, and not so large as to cover all of the perforations in the member 20. It will therefore be understood that air may be blown or pumped into the bladder 10 for the purpose of inflating the same, the air passing around the edge of the valve member 23. The pressure of air in the bladder 10 serves to hold the valve member 23 in a position to close the inner end of the passage 17 to prevent the escape of air. When it is desired to deflate the bladder it is only necessary to push the valve member 23 against the member 20 by the use of a suitable implement, the air will then pass through the perforations in the member 20 around the edge of the valve member 23 through the passage 17. The passage 17 is threaded as at 18 for the purpose of receiving a threaded nipple on a tube of a pump, or a tube which may be held in the mouth of a person for the purpose of inflating the bladder. If desired a threaded plug 24, such as the one shown in Fig. 6 may be screwed into the outer end of the passage 17 to keep foreign matter from entering. The valve 15 is securely connected with the wall of the bladder 10 by the use of a member 25 adapted to fit around a portion of the body 16. The member 25 has a flange 26. The wall of the bladder 10 is provided with a hole through which the body 16 is extended, the member 25 is then slipped on the body 16, which will bring the flanges 19 and 26 respectively on the inside and outside of the edge of the bladder 10 surrounding the hole. By the use of a suitable tool, the outer end of the body 16 is turned outwardly in contact with the member 25, as at 27, thus effectively clamping the edge portion of the bladder surrounding the hole between the flanges 19 and 26.

In order to connect the bladder 10 with the covering 11, when the bladder 10 is deflated, there is provided suitable retaining or fastening means, presently to be described. The member 25 heretofore mentioned constitutes a male member of the fastening means and is concaved to present a groove 28. The coacting means also includes a female member 29 having a split circular spring 30. The member 29 is connected with the flap 13. This is accomplished by putting a hole in the flap 13, through which the member 29 extends, there being also provided metal washers 31 and 32. The washers 31 and 32 are disposed respectively on opposite sides of the edge portion of the flap 13 surrounding the hole therein. By the use of a suitable tool, the member 29 is crimped or turned outwardly to present a circular edge 33, which coacts with a substantially conical portion 34 of the member 29 to effectively clamp the said edge of the flap between the washers 31 and 32, and to hold the member 29 in fixed position on the flap 13, at the opening 12. It will now be understood that the member 29 may be snapped over the member 25, which brings the spring 30 in the groove 28, thus the bladder 10 will be connected with the flap 13, to prevent the bladder 10 from shifting or moving around with respect to the flaps 13, and at the same time keep the valve 15 in position at the opening 12 in the cover 11, for the purpose of carrying out inflating and deflating operations.

It is to be understood that the female member 29 may be connected directly with the cover 11, instead of with the flap 13, so that the bladder 10 may be inflated and deflated without unlacing the covering 11.

I claim:

1. The combination with an inflatable bladder, and covering therefor of a play ball; of a valve on the bladder for inflating and deflating the bladder, and a snap fastener having co-acting parts respectively on the covering and the valve to detachably connect the bladder with the covering.

2. In a play ball, the combination of an inflatable bladder, a covering for the bladder, a snap fastener having co-acting parts respectively on the outside of the bladder and on the inside of the covering to connect the bladder with the covering.

3. The combination with a play ball comprising an inflatable bladder, a covering for the bladder, said covering having a placket, and a flap attached to and arranged on the inside of the covering at the placket; of a valve on the bladder for inflating and deflating the bladder, and a snap fastener having coacting parts respectively on the flap and the valve for the purpose of connecting the bladder with said flap.

4. An inflatable ball comprising a cover, a bladder therein, a member inserted in the wall of the bladder and constituting the male element of a snap fastener and a check valve, affording pneumatic access past the check valve for inflation of the bladder, a hollow member carried by the cover, and comprising the female element of a snap fastener, the two members cooperating to provide a quick-detachable anchorage between the bladder and the cover and to position the first member for access from the exterior of the cover for inflation, the first member and the bladder constituting a separate removable unit.

5. In a play ball the combination of an inflatable bladder, a covering for the bladder, a snap fastener having coacting parts respectively on the outside of the bladder and the inside of the covering to connect the bladder with the covering, the two members having central passages providing pneumatic access to the interior of the bladder for inflation.

6. An inflatable ball comprising a casing, a bladder therein, a bladder carried anchorage-valve member comprising a body having a central air passage for inflation of the bladder, a check valve incorporated in the body, a pair of flanges embracing the respective sides of the wall of the bladder for hermetically sealing the member in the wall of the bladder, and an annular head portion on the member exteriorly of the bladder, with a reduced neck portion between the head portion and the bladder, the bladder and the said member constituting a removable unit, and means for quick-detachably anchoring said unit to the inside of the cover, comprising a cover carried female snap fastener for cooperating with the head and neck portions of the anchorage-valve member.

7. An inflatable ball comprising a bladder with an annular snap fastener member hermetically sealed in its wall, a check valve carried by the member, a member having a central air passage past the valve for inflating the bladder, and a cover having an access opening through its wall and carrying a snap fastener member, in substantial registry with said opening, for cooperation with the bladder carried snap fastener member for quick-detachably anchoring the bladder on the cover.

8. A combination with an inflatable bladder of an inflation member therefor hermetically sealed in the wall, the wall of the bladder having an opening, and the member comprising a body portion extending through the opening, spaced flanges embracing the respective sides of the wall adjacent the opening to seal the member in the opening, a shallow valve chamber formed in and disposed substantially parallel with the plane of the wall adjacent said opening, an air passage through the body member and communicating with the valve chamber by a central port at one side of the valve chamber, the opposite side of the valve chamber having a perforated area, and an unpiloted flexible valve disc free to shift about laterally within the chamber, the diameter of the valve disc being greater than that of the port and sufficiently large in relation to the diameter of the chamber to insure its over-lapping the port, but smaller in diameter than the perforated area of the opposite side of the valve chamber.

9. A combination with an inflatable bladder of an inflation member therefor hermetically sealed in the wall, the wall of the bladder having an opening, and the member comprising a body portion extending through the opening, spaced flanges embracing the respective sides of the wall adjacent the opening to seal the member in the opening, a shallow valve chamber formed in and disposed substantially parallel with the plane of the wall adjacent said opening, an air passage through the body member and communicating with the valve chamber by a central port at one side of the valve chamber, another side of the valve chamber having a perforated area, and an unpiloted flexible valve disc free to shift about laterally within the chamber, the diameter of the valve disc being greater than that of the port and sufficiently large in relation to the diameter of the chamber to insure its over-lapping the port.

10. A bladder for an inflatable ball comprising a sheet rubber wall having an inflation opening and an inflation stem mounted on the wall of the bladder in association with the opening, the inflation stem being conformed to provide the male member of a snap fastening.

11. A bladder for an inflatable ball comprising a sheet rubber wall having an inflation opening and an inflation stem mounted on the wall of the bladder in association with the opening, the inflation stem being conformed to provide one member of a set of cooperating snap fasteners.

To which foregoing specification and claims the applicant hereby subscribes her name at New York, N. Y., this 14th day of July, 1930.

BEULAH LOUISE HENRY.